(12) United States Patent
Schlauch

(10) Patent No.: US 7,806,953 B2
(45) Date of Patent: Oct. 5, 2010

(54) MANUALLY GUIDED IMPLEMENT

(75) Inventor: Patrick Schlauch, Esslingen (DE)

(73) Assignee: Andreas Stihl AG & Co. KG (DE)

( * ) Notice: Subject to any disclaimer, the term of this patent is extended or adjusted under 35 U.S.C. 154(b) by 443 days.

(21) Appl. No.: 11/868,853

(22) Filed: Oct. 8, 2007

(65) Prior Publication Data

US 2008/0083199 A1 Apr. 10, 2008

(30) Foreign Application Priority Data

Oct. 7, 2006 (DE) .................... 10 2006 047 451

(51) Int. Cl.
*B01D 35/30* (2006.01)
*B01D 46/00* (2006.01)

(52) U.S. Cl. .............. 55/385.1; 55/385.3; 55/498; 55/502; 55/503; 55/504; 55/490; 55/493; 55/510; 55/511; 123/198 E; 220/4.13; 220/293; 220/297; 220/300; 24/287; 24/288; 451/451; 451/456; 451/453; 451/87; 451/88; 451/270; 451/354; 451/357; 173/71; 173/73

(58) Field of Classification Search ........... 55/385.1, 55/385.3, 498, 502, 503, 504, 490, 493, 510, 55/511; 123/198 E; 220/4.13, 293, 297, 220/300; 24/287, 288; 451/451, 456, 453, 451/87, 88, 270, 354, 357; 173/71, 73
See application file for complete search history.

(56) References Cited

U.S. PATENT DOCUMENTS 3,994,067 A * 11/1976 Hazzard et al. ............ 30/383
5,062,875 A 11/1991 Nagashima
5,269,824 A * 12/1993 Takita ....................... 55/493
5,759,217 A * 6/1998 Joy .......................... 55/320
6,299,661 B1 * 10/2001 Bloomer .................. 55/385.3
6,402,798 B1 * 6/2002 Kallsen et al. ........... 55/385.3
6,406,508 B1 * 6/2002 Bloomer .................. 55/385.3
6,564,768 B2 * 5/2003 Bauer et al. ............ 123/198 E
6,640,794 B2 * 11/2003 Weber ..................... 123/585
6,723,148 B2 * 4/2004 Stass ...................... 55/385.3
7,282,077 B2 * 10/2007 Honisch et al. ............ 55/507
7,465,328 B2 * 12/2008 Trautner et al. .......... 55/385.1
7,497,886 B2 * 3/2009 Walker .................... 55/385.1

* cited by examiner

*Primary Examiner*—Robert A Hopkins
*Assistant Examiner*—Minh-Chau Pham
(74) *Attorney, Agent, or Firm*—Robert W. Becker; Robert Becker & Associates

(57) ABSTRACT

A manually guided implement having a tool driven by an internal combustion engine, which draws combustion air in via an air filter disposed on an air filter base. The air filter is secured to the implement via a releasable securement device that includes a first securement element, and a second securement element that cooperates with the first securement element. The securement elements can be released from one another, or connected to one another, by means of a rotational movement about an axis of rotation. To achieve easy handling of the air filter, the first securement element is fixedly connected to the air filter.

19 Claims, 5 Drawing Sheets

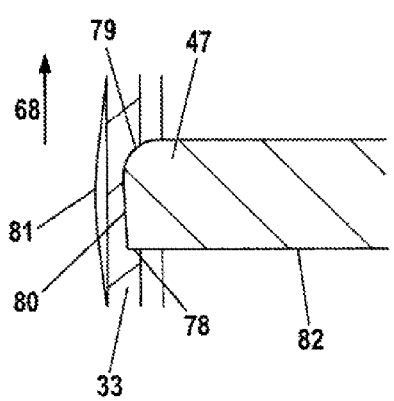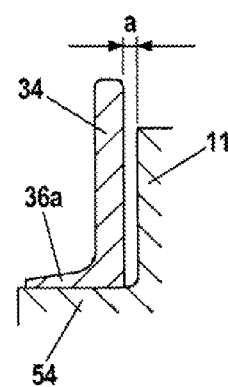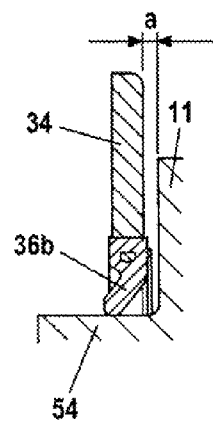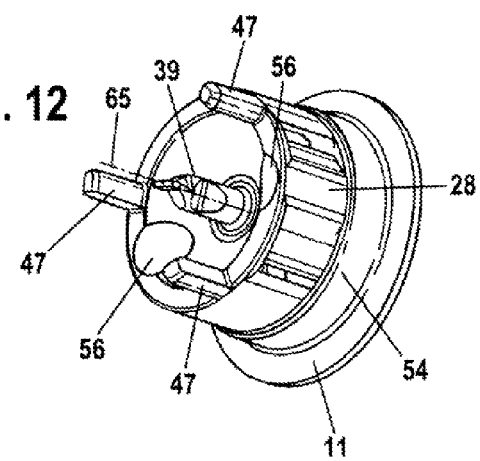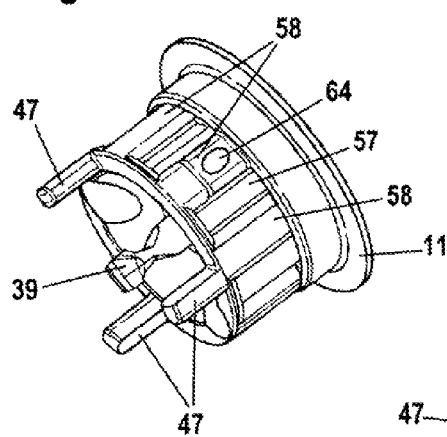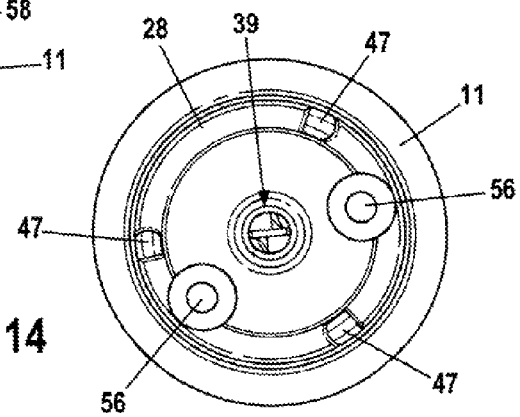

MANUALLY GUIDED IMPLEMENT

The instant application should be granted the priority date of 7 Oct. 2006, the filing date of the corresponding German patent application DE 10 2006 047 451.1.

BACKGROUND OF THE INVENTION

The present invention relates to a manually guided or portable implement having a tool driven by an internal combustion engine.

U.S. Pat. No. 5,062,875 discloses a portable implement having an air cleaner that is held between a base body and a cover member. For the fixation of the air cleaner, the cover member is screwed into a threaded bore of the base body by means of a bolt that is secured to the cover member. As a result, the air cleaner is fixed between the cover member and the base body. For the fixation of the air cleaner, not only must the air cleaner be positioned on the base body, but the cover member must also be positioned on the air cleaner, and the bolt must be introduced into the threaded bore.

It is an object of the present invention to provide a manually guided implement of the aforementioned general type, with the implement having an air filter that enables a simplified handling.

BRIEF DESCRIPTION OF THE DRAWINGS

This object, and other objects and advantages of the present application, will appear more clearly from the following specification in conjunction with the accompanying schematic drawings, in which:

FIG. 9 is a cross-sectional view taken along the line IX-IX in FIG. 5;

FIGS. 10 and 11 are cross-sectional views of embodiments of the seal of the air filter;

FIGS. 12 and 13 are perspective views of the air filter base having an impingement pot disposed thereon;

FIG. 14 is an end view of the air filter base and impingement pot of FIGS. 12 and 13;

SUMMARY OF THE INVENTION

Figure 1:
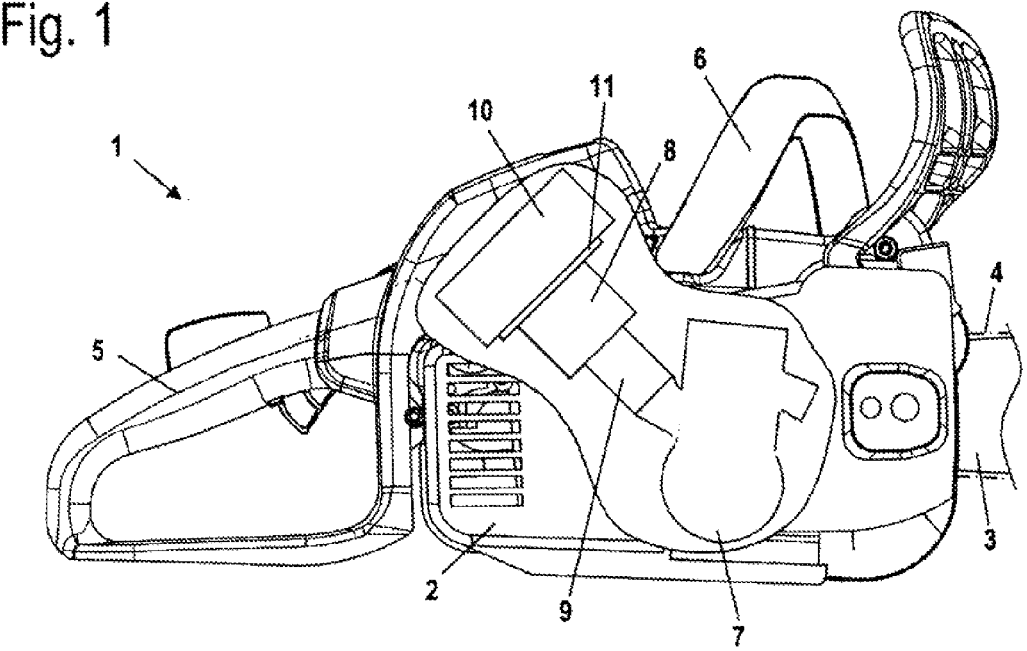
FIG. 1 shows an illustration of an implement.

The manually guided implement of the present application comprises an air filter disposed of an air filter base, wherein the internal combustion engine is adapted to draw combustion air in through the air filter, and a releasable securement device for securing the air filter to the implement, wherein the securement device includes a first securement element fixedly connected to the air filter, and a second securement element that cooperates with the first securement element, wherein the first and second securement elements can be released from one another, or connected to one another, by means of a rotational movement about an axis of rotation.

Due to the fact that one of the securement elements is fixedly connected to the air filter, for the fixation of the air filter it is merely necessary to position the air filter itself via the securement element that is fixed in position thereon. Thus, for the fixation of the air filter it is necessary to handle only one component. As a result, the air filter can be easily fixed in position on, or removed from, the implement. Due to the fact that the one securement element is fixedly disposed on the air filter, placement or loss of the securement element is avoided.

The air filter can be sealed relative to the air filter base by means of a seal that is effective exclusively in the radial direction. As a result, defined sealing conditions can be achieved. No high requirements relative to the precision and the tolerances that are to be maintained need be placed on the securement device, which advantageously holds the air filter in the axial direction. Consequently, it is possible to provide a securement device having a straightforward construction. To enable an easy handling, the rotational movement can be a rotational movement about less than 360° for the release or connection of the securement elements. The securement device is advantageously a so-called quick-release or snap-type closure, in particular a quarter turn closure. The relative rotational movement between the two securement elements is advantageously a maximum of 180° during the connection of the securement elements, and advantageously approximately 90° during the release of the elements. Expediently, one securement element is a clamp, and the other securement element is a securement bolt having at least one recessed holding portion. The recessed holding portion enables a reliable fixation of the air filter. By means of the clamp, which is expediently resilient, tolerances can be compensated for.

The second securement element is advantageously securely held on a component of the implement. For the fixation of the air filter, as a result the air filter must be rotated relative to the implement. At least one securement element is expediently comprised of a metallic material and is snapped or clipped onto a component that is comprised at least partially of polymeric material. The snapping or clamping of the securement element to the component enables a simple, reliable fixation of the securement element. No additional components are required for the fixation of the securement element onto the component. At least one securement element is advantageously made of polymeric material and is extruded onto a component that is comprised at least partially of polymeric material. Due to the extrusion of the securement element, the securement element is monolithically produced with the component in a single manufacturing step. There thus results an easy ability to manufacture, and a reliable connection between securement element and the component. One securement element is expediently made of metal and the other securement element of polymeric material. This results in a favorable pairing of materials. The polymeric material is preferably PA6.6, whereby a glass fiber reinforcement of the polyamide can be provided.

The first securement element is expediently disposed on a backplate of the air filter that faces away from the air filter base. To prevent fouling of the air filter with fuel that enters from the intake channel, an impingement pot can be disposed in the air filter in the region of an intake opening that opens into the air filter. By disposing the impingement pot in the air filter, no additional installation space is required for the impingement pot. A compact construction results. The second securement element is advantageously secured to the impingement pot.

To achieve a good fixation of the air filter, the securement device exerts a force upon the air filter that is effective in the longitudinal direction of the axis of rotation, and at least one abutment element is provided against which the air filter is supported in the longitudinal direction of the axis of rotation. The abutment element simultaneously ensures that the seal is not pressed in the axial direction against adjacent components, so that a seal that is effective exclusively in the radial direction can be easily realized. The securement device effects a biasing of the air filter against the abutment element, so that the air filter is securely held and cannot become loose on its own during operation. One abutment element advantageously acts upon that side of the air filter that is remote from the air filter base, and at least one abutment element is expediently disposed on the impingement pot.

The air filter can be embodied as a round filter having a backplate as well as a base plate that is disposed on the air filter base, whereby the filter material extends between the backplate and the base plate. In this connection, the filter material advantageously forms an essentially cylindrical wall of the air filter. The base plate can have a discharge opening out of the air filter, whereby the seal of the air filter is disposed on the periphery of the discharge opening. The seal is thus disposed on that side of the air filter that faces the air filter base, while the securement device, as well as the abutment elements, are disposed on that side of the air filter facing away from the air filter base. The air filter base expediently has a sealing rim against which the seal rests. In this connection, the impingement pot is expediently disposed within the sealing rim on the air filter base. This results in a compact construction. It is possible for the air filter base to have a diameter that is only slightly greater than the diameter of the sealing rim.

The impingement pot can be provided with a rear wall that is disposed opposite the intake opening and is spaced therefrom as well as at least one retention wall, whereby the retention wall extends between the air filter base and the rear wall of the impingement pot. The retention wall thus serves for screening the intake opening in a direction that from the intake opening faces outwardly. The impingement pot expediently has at least two first retention walls, between which is formed a passage which, in a direction that from the intake opening faces outwardly, is screened by a second retention wall that is spaced relative to the first retention walls. Combustion air can enter the impingement pot via the passage formed between the first retention walls. Due to the second retention wall, which is spaced relative to the passage, the combustion air is deflected upstream or downstream of the passage. If due to pulsation in the intake channel, combustion air with fuel passes back into the impingement pot, fuel droplets are retained by the retention walls, since the fuel droplets are retained at the retention walls due to their moment of inertia, while the combustion air can pass out of the impingement pot through the passages. To improve the retention capacity for fuel, and to ensure that retained fuel is carried along into the intake channel by the subsequently drawn-in combustion air, at least one retention wall is provided with at least one inwardly directed longitudinal edge. The retained fuel collects at the longitudinal edge. The combustion air that flows past the longitudinal edge can carry the fuel along and can supply it to the intake channel.

The internal combustion engine advantageously has a mixture channel for the supply of air mixture, and a supply channel for the supply of combustion air with a small fraction of fuel, whereby the internal combustion engine has a carburetor in which a portion of the intake channel is guided and whereby the intake channel is divided over at least a portion of its length into the mixture channel and the supply channel. Due to the fact that the internal combustion engine has a mixture channel as well as a supply channel, the internal combustion engine, which is in particular embodied as a two-cycle engine, can be operated with scavenging. The combustion air which is supplied via the supply channel is advantageously largely free of fuel. However, it would also be possible for small quantities of fuel to be supplied to the internal combustion engine via the supply channel. In particular, in prescribed operating states, for example during idling, fuel/air mixture can also be supplied to the internal combustion engine via the supply channel, while in other operating states, for example at full throttle, the fuel can be supplied essentially via the mixture channel. A small quantity of fuel in the supply channel can also result from leakage of the channels, for example due to tolerances. Due to the fact that the mixture channel and the supply channel are formed in a common intake channel, it is necessary to form only a single channel over at least a portion of the length of the channels. Consequently, a simplified construction results, as well as a compact construction of the internal combustion engine. The impingement pot advantageously has a partition that divides the intake opening into a mixture channel and a supply channel opening. In this way, the mixture channel and the supply channel are also separated from one another in the impingement pot, thus preventing passage of mixture from the mixture channel into the supply channel in the impingement pot.

The carburetor can be embodied as a diaphragm carburetor having a compensation chamber, whereby the compensation chamber communicates with the clean side of the air filter via a compensation channel, and whereby a portion of the compensation channel connects a compensation connector, which opens out at the air filter base within the impingement pot, with a region external of the impingement pot. Due to the fact that the compensation connector is disposed at the air filter base within the impingement pot, a compact construction of air filter base and carburetor results. The compensation channel can be short. Due to the fact that a portion of the compensation channel connects the compensation connector with a region external of the impingement pot, there is ensured that no fuel can pass into the compensation connector. The portion of the compensation channel can thus be monolithically formed with the air filter base. It would also be possible to monolithically form the portion of the compensation channel with the impingement pot. As a result, no additional components are required for the guidance of the compensation channel in the air filter. The expenditure for manufacture and assembly is reduced.

At least one shoulder or stop, disposed in the direction of rotation, is advantageously provided, thus ensuring that in the position where it is fixed to the implement, the air filter cannot be rotated any further. A release or removal is possible only in the opposite direction.

Further specific features of the present invention will be described in detail subsequently.

DESCRIPTION OF SPECIFIC EMBODIMENTS

Referring now to the drawings in detail, the implement 1 shown in FIG. 1 is in the form of a power saw and has a housing 2 on which is disposed a guide bar 3. Rotatingly guided on the guide bar 3 is a saw chain 4, which is shown schematically in FIG. 1. The saw chain 4 is driven by an internal combustion engine 7 that is disposed in the housing 2. The internal combustion engine 7 is connected to an air filter 10 via a connector 9 and a carburetor 8. The air filter 10 is supported on an air filter base 11. Secured to the housing 2 of the implement 1 are a rear handle 5 as well as a tubular handle 6 for guiding the implement 1. The present invention can also be used with other implements, such as, for example, cut-off machines, brushcutters, trimmers, etc.

Figure 2:
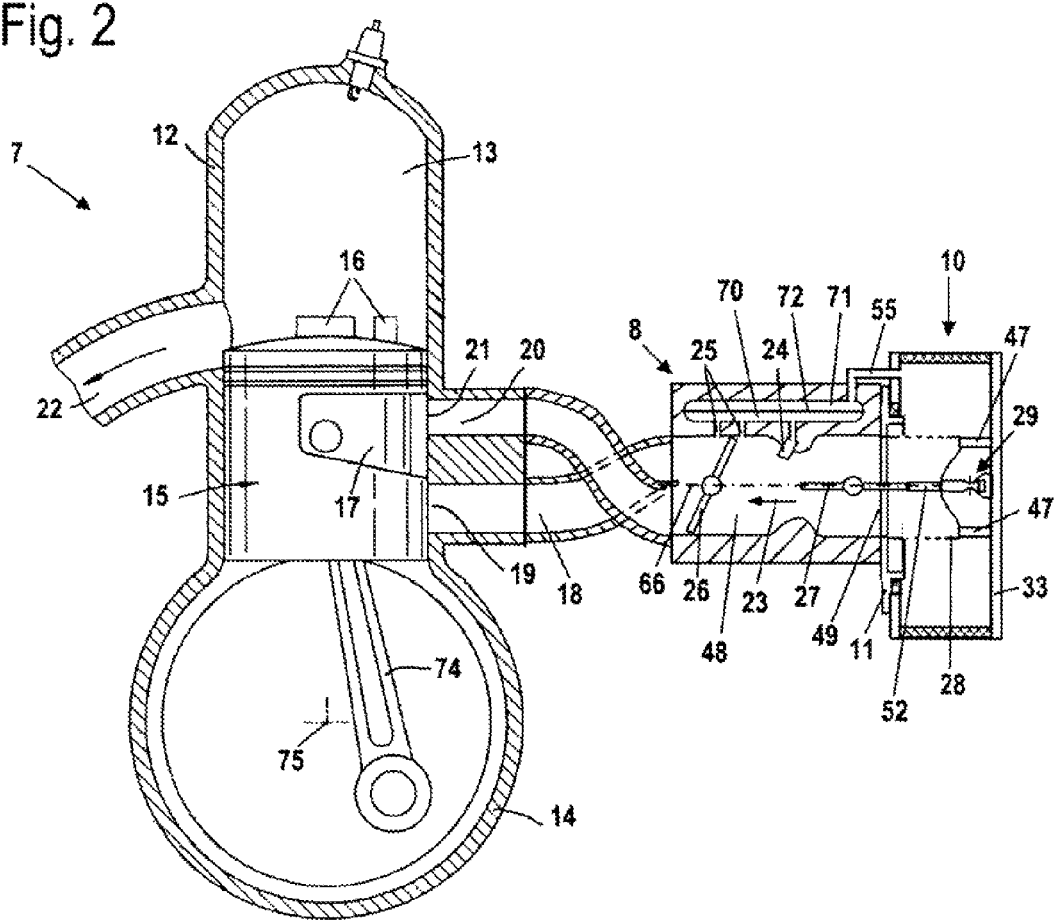
FIG. 2 shows an illustration of the internal combustion engine of the implement of FIG. 1.

The internal combustion engine 7 is shown in FIG. 2, and is embodied as a two-cycle engine that operates with scavenging. However, the internal combustion engine 7 can also be a mixture-lubricated or a separately-lubricated four-cycle engine. The internal combustion engine 7 has a cylinder 12 in which is formed a combustion chamber 13. Reciprocably mounted in the cylinder 12 is a piston 15 that, by means of a connecting rod 74, drives a crankshaft 75 that is rotatably mounted in a crankcase 14. In the lower dead center position of the piston 15 shown in FIG. 2, the crankcase 14 is connected with the combustion chamber 13 via transfer channels 16. A mixture channel 18 having a mixture inlet 19 opens out into the crankcase 14 at the cylinder 12. A supply channel 20 opens out via a supply channel inlet 21 in the region of a piston pocket 17 at the cylinder 12. When the piston 15 is in the upper dead center position, the piston pocket 17 connect the supply channel 20 with the transfer channels 16. The arrangement of mixture inlet 19 and supply channel inlet 21 is schematically shown in FIG. 2. An outlet 22 leads out of the combustion chamber 13.

The internal combustion 7 draws in combustion air via the carburetor 8. An intake channel 48 is formed in the carburetor 8, and opens out at the air filter base 11 by means of an intake opening 49. The carburetor 8 is embodied as a diaphragm carburetor, and has a regulation chamber 70 into which fuel is conveyed by a non-illustrated fuel pump. The regulation chamber 70 is delimited by a regulation diaphragm 72. Formed on that side of the regulation diaphragm 72 that faces away from the regulation chamber 70 is a compensation chamber 71 that is connected to the clean side of the air filter 10 via a compensation channel 55. A main fuel opening 24 as well as auxiliary fuel openings 25, which are supplied from the regulation chamber 70, open out into the intake channel 48. A butterfly valve 26 is pivotally mounted in the intake channel 48, and a choke valve 27 is disposed upstream of the butterfly valve 26. In the intake channel 48, combustion air flows in a direction of flow 23 to the internal combustion engine 7.

In the respectively completely opened position, the butterfly valve 26 as well as the choke valve 27 divide the intake channel 48 into the mixture channel 18 and the supply channel 20. It would also be possible to dispose a partition in the carburetor 8 that partially or entirely separates the mixture channel 18 from the supply channel 20. The intake channel 48 has a longitudinal axis 66 that represents the longitudinal center line of the intake channel 48.

Disposed in the air filter 10 is an impingement pot 28, which surrounds the intake opening 49. Disposed in the impingement pot 28 is a partition 52 that continues the division of the intake channel 48, into the mixture channel 18 and the supply channel 20, into the air filter 10. The air filter 10 is fixed to the air filter base 11 via a securement device 29, which is effective between a backplate 33 of the air filter 10 and the impingement pot 28. As will be described in greater detail subsequently, the securement device 29 exerts a force upon the air filter 10 in the direction of the longitudinal axis 66 of the intake channel 48. The air filter 10 is pulled against the air filter base 11. To ensure a defined spacing between the air filter 10 and the air filter base 11, disposed on the impingement pot 28 are stop pins 47 that act against the backplate 33 and fix the air filter 10. It is to be understood that other stop or abutment elements could also be provided in place of the stop pins 47. The stop pins 47 are formed on the impingement pot 28.

Figure 3:
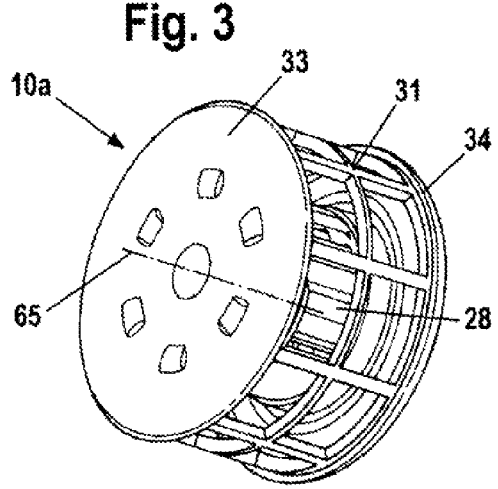
FIGS. 3 and 4 show perspective illustrations of embodiments of the air filter of the implement.

FIG. 3 shows an embodiment for the air filter 10. The air filter 10a shown in FIG. 3 is embodied as a round filter and has a backplate 33 as well as a base plate 34, which faces the air filter base 11. Extending between the two plates 33 and 34 is a grille 31 to which can be secured non-illustrated filter material in the form of filter mesh. The air filter base 11 can be fixed to the housing 2 of the implement 1 via non-illustrated securement means.

Figure 4:
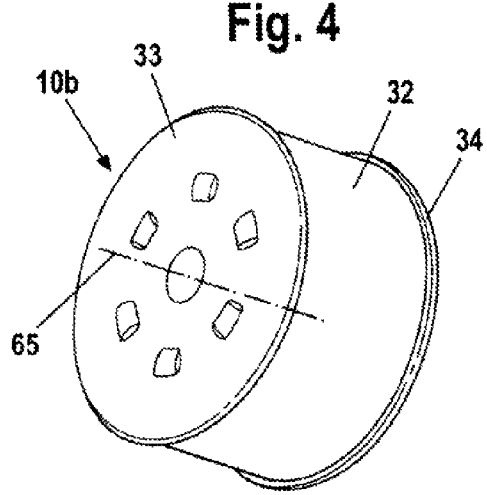

In the embodiment of the air filter 10b shown in FIG. 4, filter paper 32, which is folded in the customary manner, is disposed between the backplate 33 and the base plate 34. Due to the stability of the filter paper 34, no support grille is required.

Figure 5:
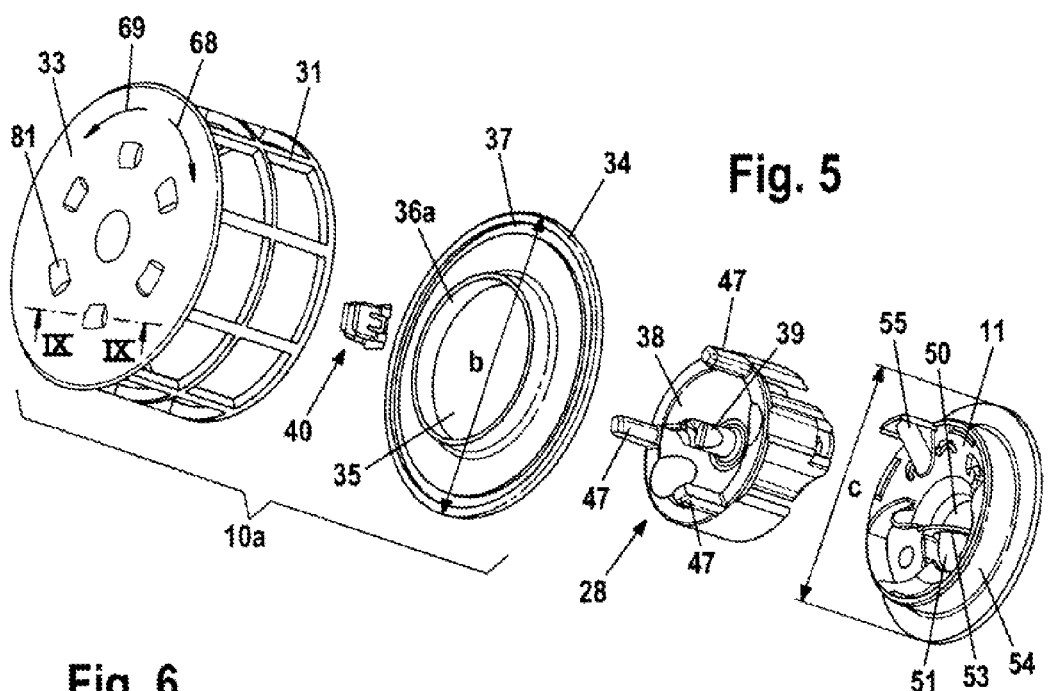
FIG. 5 is an exploded view of the air filter of FIG. 3.

FIG. 5 is an exploded view of an air filter, by way of example the air filter 10a. The air filter 10b, with the exception of the grille 31, the filter material, and a seal that will be described in detail subsequently, has an identical construction. The base plate 34 has a central discharge opening 35, by means of which the combustion air leaves the air filter 10a. Disposed at the periphery of the discharge opening 35 is a seal 36a. The base plate 34 has a groove 37 for receiving the grille 31. A corresponding groove can also be provided for the air filter 10b for receiving the filter paper 32.

Fixed on the backplate or rear wall 33 of the air filter 10a is a clamp 40 that cooperates with a securement bolt 39. The backplate 33 is fixedly connected via the filter material, and with the air filter 10a via the grille 31, with the base plate 34, and forms therewith the air filter 10, to which the clamp 40 is fixed. The securement bolt 39 is formed on a rear wall 38 of the impingement pot 28. The clamp 40 is snapped or clamped onto the plastic backplate 33 of the air filter 10a. It is to be understood that other types of securement could also be provided. The clamp 40 is comprised of a bent metal sheet. The securement bolt 39, as well as the impingement pot 28, are comprised of a fiber-reinforced polyamide, advantageously PA6.6 GF30. The stop pins 47 are formed on the rear wall 38 of the impingement pot 28, and project in the direction toward the backplate 33 of the air filter 10a. In the illustrated embodiment, three stop pins 47 are provided.

Figure 16:
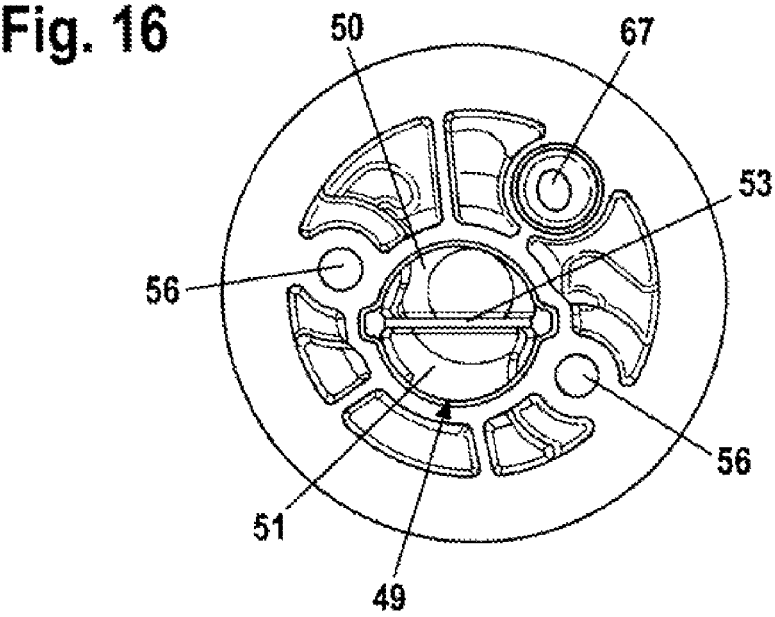
FIG. 16 is an end view of the air filter base from the side facing the carburetor.

The air filter base 11 has a sealing rim 54 that projects from the base 11 into the air filter 10a. Opening out at the air filter base 11 is the intake opening 49, which is divided into a mixture channel opening 50 and a supply channel opening 51 by a partition section 53, which is formed on the air filter base 11. Opening out within the sealing rim 54 is a compensation connector 67, which is shown in FIG. 16 and which, in a portion of the compensation channel 55 (FIG. 5) formed on the air filter base 11, is guided radially outwardly into a zone external of the impingement pot 28.

As shown in FIG. 5, the base plate 34 of the air filter 10a has a diameter b. The air filter base 11 has a diameter c that is less than the diameter b. The diameter c can, for example, be less than 80% of the diameter b.

Figure 6:
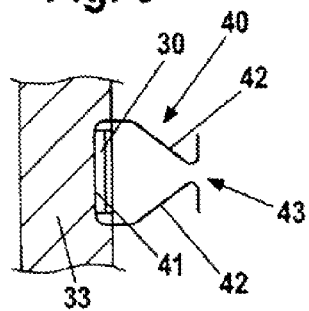
FIG. 6 is a cross-sectional illustration of the clamp of the securement device.
Figure 7:
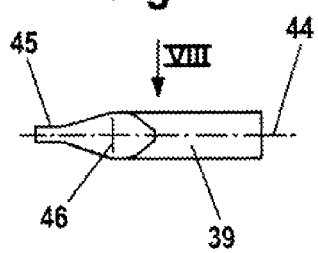
FIG. 7 is a side view of the securement bolt of the securement device.
Figure 8:
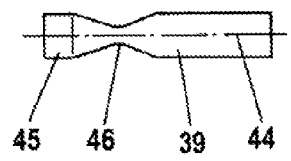
FIG. 8 is a side view of the securement bolt taken in the direction of the arrow VIII in FIG. 7.

The securement device 29 is shown in greater detail in FIGS. 6 to 8. FIG. 6 shows the clamp 40 snapped or clipped to the backplate 33. The clamp 40 has a base 41 at which the clamp 40 is held by one or more snap-fit or arresting hooks 30 of the backplate 33. Two symmetrically formed arms 42 project from the base 41 in the direction toward the impingement pot 28. The arms 42 have a resilient construction and extend toward one another. A receiving opening 43 is formed between the arms 42. The securement bolt 39, which is shown in FIGS. 7 and 8, has a flattened portion 45 by means of which the securing bolt 39 can be introduced into the receiving opening 43 of the clamp 40. As shown in FIG. 8, the securement bolt 39 is provided with symmetrically formed recessed holding portions 46, which are rotated relative to the flattened portion 45 by 90° about a longitudinal axis 44 of the securement bolt 39.

For the fixation of the air filter 10, the air filter is guided over the impingement pot 28 in such a way that the flattened portion 45 comes to rest in the receiving opening 43 of the clamp 40. Subsequently, the air filter 10 is rotated by 90° about the axis of rotation 65, which is shown in FIGS. 2 to 4 and which is also the axis of symmetry of the air filter 10. In so doing, the clamp 40 is guided by the flattened portion 45 into the recessed holding portions 46. During the rotation, the air filter carries out a movement in a direction toward the air filter base 11. For the fixation, the air filter 10 is rotated in the direction of the arrow 68 shown in FIG. 5. In the fixed state of the air filter shown in FIG. 2, the clamp 40 pulls the securement bolt 39 in a direction toward the backplate 33. As a result, the air filter 10 is pressed against the stop pins 47 and is thus securely fixed.

To loosen the air filter, the air filter is rotated by 90° into the opposite direction of rotation, which is designated by the arrow 69 in FIG. 5. As a result, the clamp 40 passes out of the recessed holding portions 46 back into the flattened portion 45. In this position, it is possible to remove the air filter 10. During the rotation, the air filter 10 also carries out a movement in the longitudinal direction of the axis of rotation 65, and in particular during the connection of the clamp 40 and the securement bolt 39 in a direction toward the air filter base 11, and during the loosening away from the air filter base 11. It is to be understood that other quick-release or snap-type closures, in particular other quarter turn closures, can also be provided for the fixation of the air filter 10. For the fixation of the air filter on the air filter base 11, the air filter must be rotated by a maximum of 180°, since initially the clamp comes into engagement with the flattened portion 45, and subsequently the air filter must be rotated by 90°. When the clamp is placed upon the flattened portion 45, it is also possible to perform a rotation in the opposite direction until the clamp 40 has gripped the flattened portion 45.

The air filter 10 can be fixed on the air filter base 11 in only one direction of rotation, and can be loosened in only the opposite direction of rotation. For this purpose, an abutment or stop can be provided on the air filter 10 that, for example, can cooperate with the air filter base 11 or with the impingement pot 28, and prevents a rotation of the air filter 10 out of the position where it is mounted on the air filter base 11 in the direction of rotation 68 (FIG. 5).

As shown in FIG. 5, the backplate 33 of the air filter 10 has a total of six raised portions 81, which are respectively spaced from one another by 60°. FIG. 9 shows a cross-section through one of the raised portions 81 when the air filter 10 is fixed to the air filter base 11. As shown in FIG. 9, formed on the inner side of the backplate 33, in the region of the raised portion 81, is a recessed arresting portion 80 in which one of the stop pins 47 comes to rest. The stop pin 47 has a flat side 82 that faces counter to the direction of rotation, characterized by the arrow 68, for the fixation of the air filter 10 to the air filter base 11. For the fixation of the air filter 10, the backplate 33 is moved in the direction of the arrow 68 relative to the stop pin 47. On its side adjacent to the flat side 82, the recessed arresting portion 80 has a shoulder or stop 72 that is formed by a wall that extends parallel and radially relative to the axis of rotation 65. A rounded slide surface 79 is formed on the opposite side, relative to the direction of rotation. For the closure, the backplate 33 is moved in the direction of the arrow 68 relative to the stop pin 47, until the stop pin 47 comes to rest in the recessed arresting portion 80. Further rotation of the air filter 10 is not possible since the flat side 82 rests against the stop 78. For the loosening of the air filter 10, the air filter must be rotated in the opposite direction. The slide surface 79, as a result of its rounded shape, facilitates a sliding of the backplate 33 on the stop pin 47, so that the stop pin can come out of the recessed arresting portion 80. Since a total of six recessed arresting portions 80 are provided at the six raised portions 81, each stop pin 47 comes to rest in a recessed arresting portion 80. In this connection, in both starting positions, which are rotated by 180° relative to one another, the air filter 10 can be placed upon the flattened portion 45 of the securement bolt 39.

FIG. 10 shows an embodiment of a seal 36a for the air filter 10a. The seal 36a rests flat against the sealing edge 54. In the assembled position of the air filter 10a, the base plate 44 is spaced from the air filter base 11 by a distance a, so that the seal 36a is effective only in the radial direction. In the axial direction, the seal 36a does not rest against the air filter base 11. The seal 36a is made of the same material as is the base plate 34, and is formed thereon. Base plate and seal can be made, for example, of polypropylene (PP).

FIG. 11 shows an embodiment of a seal 36b for the air filter 10b. The seal 36b is made of a different material than is the base plate 34, and is advantageously extruded thereon. However, other types of fixation of the seal 36b on the base plate 34 can also be provided. The seal 36b can be made, for example, of a thermo plastic elastomer or of nitrile-butadiene rubber. The base plate 34 can be made, for example, of polypropylene or polyamide. The seal 36b is also spaced from the air filter base 11 by a distance a so that the seal 36b is effective exclusively in the radial direction and rests only against the sealing edge 54.

FIGS. 12 to 16 show the air filter base 11 with the impingement pot 28. As shown in FIG. 13, the compensation channel 55 opens out via an opening 64 at the outer periphery of the impingement pot 28. As shown in FIGS. 12 to 16, the impingement pot 28 and the air filter base 11 have mounting openings 56. Staybolts can extend through the mounting openings 56 via which the carburetor 8 is also secured to the internal combustion engine 7.

Figure 15:
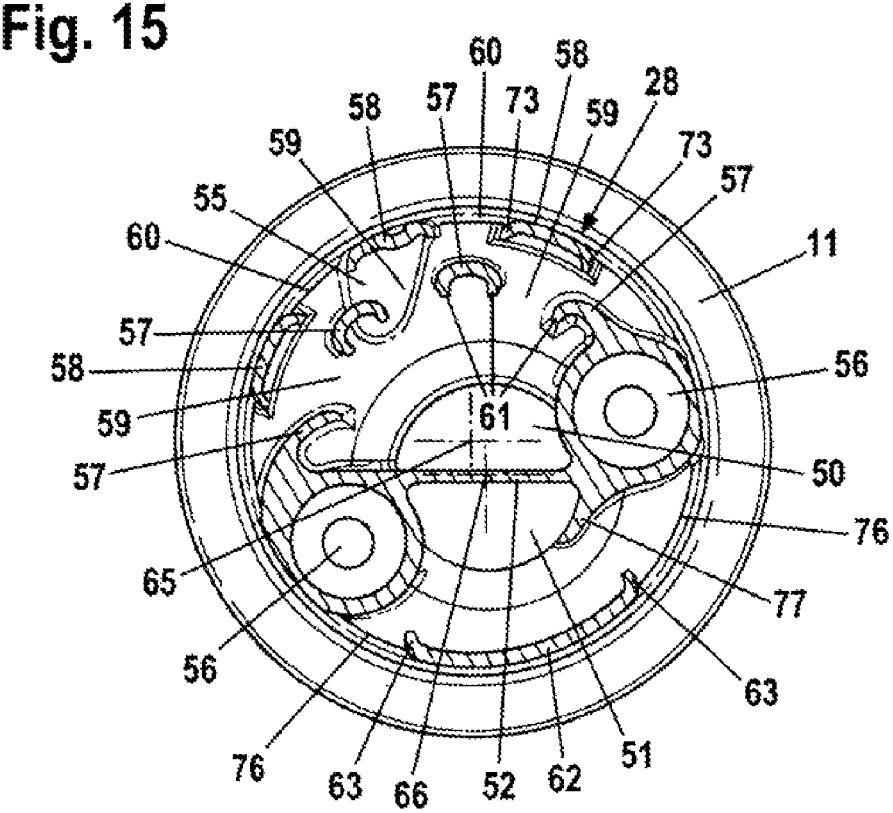
FIG. 15 is a cross-sectional view of the impingement pot of FIG. 14.

FIG. 15 shows a cross-section through the impingement pot 28. As shown in FIG. 15, the axis of rotation 65 is offset relative to the longitudinal axis 66 of the intake channel 48. The mixture channel opening 50 and the supply channel opening 51 are separated from one another by the partition 52. In this connection, the supply channel opening 51, in a normal operating attitude or position of the implement 1, is disposed below the mixture channel opening 50. A retention wall 62 is disposed radially outwardly of the supply channel opening 51. Respective passages 76 are formed in the peripheral direction between the retention wall 62 and the wall sections that surround the mounting openings 56; the combustion air can be drawn into the supply channel opening 51 via the passages 76. The retention wall 62 has longitudinal edges 63 that are bent inwardly toward the supply channel opening 51. A retention wall 77 is formed on a wall section that surrounds the mounting opening 56; the retention wall 77 screens a passage 76 to the supply channel opening 51.

First retention walls 57 are disposed at the mixture channel opening 50. Two first retention walls 57 are formed on the wall sections that surround the mounting openings 56, and two further first retention walls 57 are provided therebetween. All of the retention walls 57 are spaced from the mixture channel opening 50. Respective passages 59 are formed between the first retention walls 57. Respective second retention walls 58 are disposed on that side of each passage 59 that faces away from the mixture channel opening 50, and are spaced relative to the passages 59. Passages 60 are formed between the retention walls 58. The passages 60 are screened relative to the mixture channel opening 50 by the first retention walls 57. The passages 59 are screened radially outwardly by the second retention walls 58. As a result, combustion air that is drawn in toward the mixture channel opening 50 is deflected by the retention walls 57 and 58. The retention walls 57 have longitudinal edges 61 that are bent inwardly and extend toward the mixture channel opening 50. The second retention walls 58 also have longitudinal edges 73 that are bent inwardly toward the mixture channel opening 50. The retention walls 57, 58, 62, 77 receptively extend between the air filter base 11 and the rear wall 38 of the impingement pot 28, and are oriented parallel to the longitudinal axis 66 of the intake channel 48.

Figure 17:
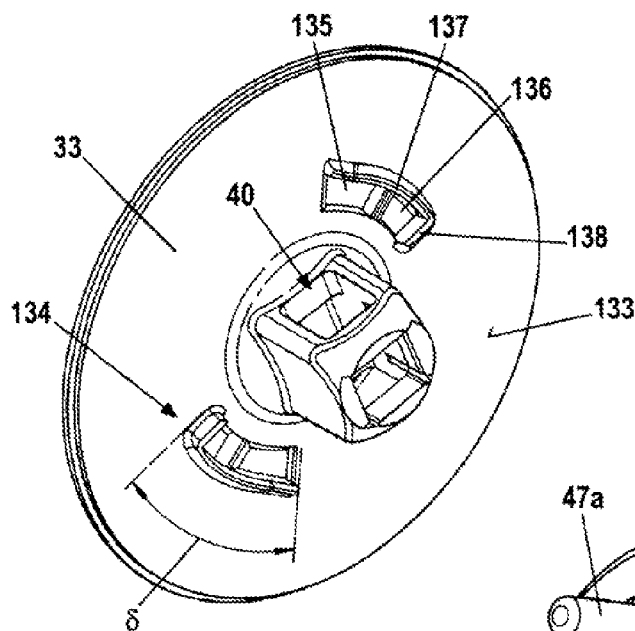
FIG. 17 is a perspective view onto the inner side of the backplate of a modified air filter.
Figure 18:
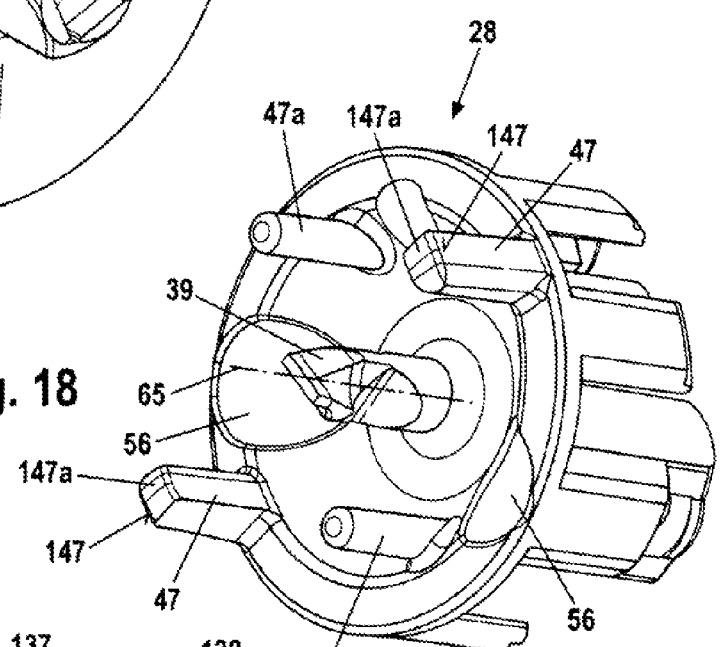
FIG. 18 is a perspective view of a modified impingement pot.
Figure 19:
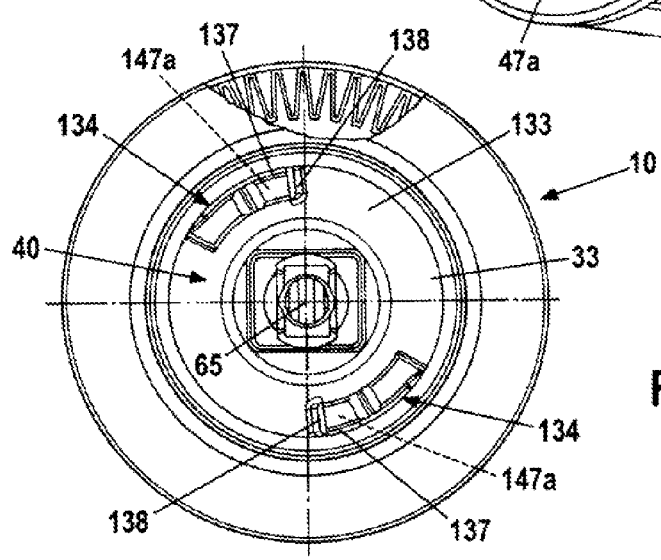
FIG. 19 is a view from below of the modified air filter.

FIGS. 17 to 19 show parts of an air filter 10 with an impingement pot 28 in a modified embodiment. The same components as in the embodiments of FIGS. 3 to 16 have the same reference numerals.

As shown in FIG. 17, provided on the inner side in the base 133 of the backplate 33 are semicircular peripheral grooves 134 that extend over a peripheral angle δ of approximately 40 or 50°. The groove base 135 of each of the peripheral grooves 134 extends out of the plane of the inner side of the backplate 33 at an incline to a lowest location 136 of the peripheral groove 134. In the illustrated embodiment, two approximately diametrically oppositely disposed peripheral grooves 134 are provided, whereby their outer walls 137 serve for the radial centering of the air filter 10 (FIG. 19) on the impingement pot 28.

Associated with the peripheral grooves 134 are stop pins 47, two diametrically oppositely disposed ones of which are shown in the embodiment of FIGS. 17 to 19. The stop pins 47 are disposed on a diameter that coincides with the diameter of the peripheral grooves 134. The arrangement is such that radially outwardly disposed guide surfaces 147 provided on the head 147a of the stop pins 47 come to rest against the outer walls 137 of the peripheral grooves 134. When the air filter 10 is placed on and rotated about the axis 65, the heads 147a of the stop pins 47 run into the peripheral grooves 134, whereby the guide surface 137 cooperate with the outer walls 137 and radially center the air filter 10. In this connection, the end 138 of the peripheral groove 134 can simultaneously act as a rotation abutment. FIG. 19 shows the position of the heads 147a of the stop pins 47 in the peripheral grooves 134 of the backplate 133.

In addition to the stop pins 47, supplemental support domes 47a are provided that are offset relative to the stop pins 47 in the circumferential direction, preferably at an equidistant circumferential spacing. The two support domes 47a are disposed diametrically opposite one another and, when the air filter 10 is installed, serve as an abutment or support of the inner side of the backplate 33. The backplate 33 is thus preferably supported in common by the support domes 47a and the stop pins 47. The number of support domes 47a and/or of the stop pins 47 can be selected in conformity with requirements. For example, two stop pins 47 can be sufficient; expediently, at least three stop pins 47 are provided if no supplemental support domes 47a are provided.

The specification incorporates by reference the disclosure of German priority document DE 10 2006 047 451.1 filed 7 Oct. 2006.

The present invention is, of course, in no way restricted to the specific disclosure of the specification and drawings, but also encompasses any modifications within the scope of the appended claims.

What I claim is:

1. A manually guided implement having a tool driven by an internal combustion engine, comprising:
    an air filter disposed on an air filter base, wherein said internal combustion engine is adapted to draw combustion air in through said air filter; and
    a releasable securement device for securing said air filter to said implement, wherein said securement device includes a first securement element fixedly connected to said air filter, and a second securement element that cooperates with said first securement element, wherein said first and second securement elements are adapted to be released from one another, or to be connected to one another, by means of a rotational movement about an axis of rotation, wherein one of said securement elements is a clamp and the other of said securement elements is a securement bolt having at least one recessed holding portion, and wherein said clamp is provided with at least one resilient arm.

2. An implement according to claim 1, wherein at least one of said securement elements is made of a metallic material and is snapped or clipped to a component that is comprised at least partially of polymeric material.

3. An implement according to claim 1, wherein at least one of said securement elements is made of polymeric material and is extruded on a component that is comprised at least partially of polymeric material.

4. A manually guided implement having a tool driven by an internal combustion engine, comprising:
    an air filter disposed on an air filter base, wherein said internal combustion engine is adapted to draw combustion air in through said air filter; and
    a releasable securement device for securing said air filter to said implement, wherein said securement device includes a first securement element fixedly connected to said air filter, and a second securement element that cooperates with said first securement element, wherein said first and second securement elements are adapted to be released from one another, or to be connected to one another, by means of a rotational movement about an axis of rotation, wherein said securement device is adapted to exert on said air filter a force that is effective in the longitudinal direction of said axis of rotation, and wherein at least one abutment is provided against which said air filter is supported in the longitudinal direction of said axis of rotation.

5. An implement according to claim 4, which further includes an impingement pot disposed in said air filter in the region of an intake opening that opens into said air filter, wherein said second securement element is secured to said impingement pot, wherein one abutment acts against that side of said air filter that faces away from said air filter base, and wherein at least one abutment is disposed on said impingement pot.

6. An implement according to claim 5, wherein said air filter base is provided with a sealing rim against which a seal rests, and wherein said impingement pot is disposed on said air filter base within said sealing rim.

7. An implement according to claim 5, wherein said impingement pot has a rear wall that is disposed opposite said intake opening and is spaced from said intake opening, further wherein said impingement pot is provided with at least one retention wall, and wherein said at least one retention wall extends between said air filter base and said rear wall of said impingement pot.

8. An implement according to claim 7, wherein said impingement pot has at least two first retention walls, further wherein a passage is formed between said at least two first retention walls, further wherein a second retention wall that is spaced relative to said at least two first retention walls is provided, and wherein said passage, in a direction facing outwardly from said intake opening, is screened by said second retention wall.

9. An implement according to claim 7, wherein at least one of said at least one retention wall is provided with at least one inwardly directed longitudinal edge.

10. An implement according to claim 5, wherein said internal combustion engine is provided with a mixture channel for supply of fuel/air mixture, and a supply channel for supply of combustion air having s small fraction of fuel, and wherein said internal combustion engine is provided with a carburetor in which is guided a portion of an intake channel.

11. An implement according to claim 10, wherein said intake channel is divided over at least a portion of its length into said mixture channel and said supply channel, further wherein said impingement pot is provided with a partition that divides said intake opening into a mixture channel opening and a supply channel opening, and wherein said at least one first retention wall and said second retention wall are disposed in the region of said mixture channel opening.

12. An implement according to claim 5, wherein said internal combustion engine is provided with a carburetor in the form of a diaphragm carburetor having a compensation chamber, further wherein said compensation chamber communicates with a clean side of said air filter via a compensation channel, and wherein a portion of said compensation channel connects a compensation connector, which opens out at said air filter base within said impingement pot, with a region external of said impingement pot.

13. An implement according to claim 4, wherein at least one shoulder or stop is provided that is disposed in a direction of rotation.

14. A manually guided implement having a tool driven by an internal combustion engine, comprising:

an air filter disposed on an air filter base, wherein said internal combustion engine is adapted to draw combustion air in through said air filter, and wherein said air filter is provided with filter material and a seal; and a releasable securement device for securing said air filter to said implement, wherein said securement device includes a first securement element fixedly connected to said air filter, and a second securement element that cooperates with said first securement element, wherein said first and second securement elements are adapted to be released from one another, or to be connected to one another, by means of a rotational movement about an axis of rotation.

15. An implement according to claim 14, wherein said seal seals said air filter relative to said air filter base, and wherein said seal is effective exclusively in a radial direction.

16. An implement according to claim 14, wherein said rotational movement is a rotational movement about less than 360° for release or connection of said securement elements.

17. An implement according to claim 14, wherein said second securement element is fixedly supported on a component of said implement.

18. An implement according to claim 14, wherein said air filter includes a backplate that faces away from said air filter base, and wherein said first securement element is disposed on said backplate.

19. An implement according to claim 14, wherein said air filter is embodied as a round filter having a backplate, and a base plate disposed on said air filter base, further wherein said filter material extends between said backplate and said base plate, further wherein said base plate is provided with a discharge opening out of said air filter, and wherein said seal of said air filter is disposed at a periphery of said discharge opening.

* * * * *